(12) United States Patent
Sugiyama et al.

(10) Patent No.: US 7,767,602 B2
(45) Date of Patent: Aug. 3, 2010

(54) FLAMEPROOF ARTIFICIAL LEATHER

(75) Inventors: Sho Sugiyama, Nobeoka (JP); Akiharu Muraoka, Ashiya (JP)

(73) Assignee: Asahi Kasei Fibers Corporation, Osaka-Shi (JP)

( * ) Notice: Subject to any disclaimer, the term of this patent is extended or adjusted under 35 U.S.C. 154(b) by 814 days.

(21) Appl. No.: 11/596,665

(22) PCT Filed: Feb. 18, 2005

(86) PCT No.: PCT/JP2005/002630

§ 371 (c)(1),
(2), (4) Date: Nov. 16, 2006

(87) PCT Pub. No.: WO2005/111300

PCT Pub. Date: Nov. 24, 2005

(65) Prior Publication Data

US 2008/0045104 A1    Feb. 21, 2008

(30) Foreign Application Priority Data

May 18, 2004 (JP) ............................. 2004-147863

(51) Int. Cl.
*D03D 15/00* (2006.01)
*D06N 3/00* (2006.01)

(52) U.S. Cl. ...................................... 442/301; 428/151

(58) Field of Classification Search ................ 442/136, 442/144, 301; 428/151, 920, 921
See application file for complete search history.

(56) References Cited

FOREIGN PATENT DOCUMENTS

| EP | 1 371 774 A2 | 12/2003 |
|---|---|---|
| EP | 1 375 730 A1 | 1/2004 |
| JP | 55-142756 | 11/1980 |
| JP | 10-176030 | 6/1998 |
| JP | 2002105871 | 4/2002 |
| JP | 2003-137037 | 5/2003 |
| JP | 2003-155672 | 5/2003 |
| JP | 2003-155673 | 5/2003 |
| JP | 2004-19010 | 1/2004 |
| JP | 2004-107840 | 4/2004 |

OTHER PUBLICATIONS

Office Action in Canadian Application No. 2,566,884, Apr. 3, 2009.

*Primary Examiner*—Arti Singh-Pandey
(74) *Attorney, Agent, or Firm*—Finnegan, Henderson, Farabow, Garrett & Dunner, L.L.P.

(57) ABSTRACT

A flameproof artificial leather comprising an artificial leather base fabric in which thermoplastic synthetic fibers are three dimensionally interlaced with each other and a water-soluble polyurethane resin, and having a layer (A) that is a surface layer and a layer (B) that is other than the layer (A), the fiber forming the layer (A) is an extremely fine thermoplastic synthetic fiber having a size of 0.5 dtex or less and excellent in a resistance to abrasion and/or a resistance to light, the extremely fine thermoplastic synthetic fiber being formed from a polyester homopolymer that has an intrinsic viscosity (IV) of 0.50 to 0.70, the content of the extremely fine thermoplastic synthetic fiber being from 10 to 60% by weight based on the artificial leather base fabric, at least one layer of the layer (B) having a phosphorus-containing flameproof thermoplastic synthetic fiber, the content of phosphorus being 0.09% by weight or more based on the artificial leather base fabric, the content of the water-soluble polyurethane resin being from 5 to 20% by weight based on the artificial leather base fabric.

7 Claims, 1 Drawing Sheet

FLAMEPROOF ARTIFICIAL LEATHER

FIELD OF THE INVENTION

The present invention relates to an artificial leather containing no halogen compounds that can become a dioxin source.

BACKGROUND ART

The market of artificial leathers formed from extremely fine synthetic fibers such as polyester fibers has heretofore been enlarged in applications such as clothing, family furniture and seats for vehicles because they have a good surface appearance, a good feel that is soft and swollen, easy handleability and provide fastness of various types. However, there have been restrictions on using the artificial leathers for applications that require the artificial leathers to have flameproof properties due to the poor self-extinguishability that is a disadvantage of synthetic fibers.

In order to solve the problems, it has been usual to make the synthetic fibers flameproof by making the synthetic fibers contain halogen compounds, containing chlorine or bromine as a main component, or antimony compounds. However, synthetic fibers having been made flameproof by such a method have problems that the compounds themselves, contained in the fibers, have toxicity and that there is fear of generating dioxin during incineration. Accordingly, there is a tendency to restrict the use of such compounds.

Japanese Examined Patent Publication (Kokoku) No. 3-80914 and Japanese Unexamined Patent Publication (Kokai) No. 5-302273 disclose a method of back coating with a flame retarder as a technology for giving flameproof finish to an artificial leather with a suede finish. The method has been developed principally for seats for vehicles and seats for aircraft. The artificial leathers thus obtained have a rough and stiff feel. They are unsatisfactory to the touch and, moreover, show insufficient stretchability. The artificial leathers therefore have the disadvantage that they show inadequate workability when used for products having complicated shapes. Furthermore, when the artificial leathers are back coated with a flame retarder, they each show a weight increase of 100 g/m$^2$ or more. The method is therefore undesirable for automobiles that use many lightening technologies.

There is a method of impregnating an artificial leather in a finishing step after dyeing with an organic phosphorus type flame retarder that does not generate a harmful gas and has good flameproof properties. However, the phosphorus type flame retarder is generally water soluble, and has poor affinity with the fiber. The flame retarder therefore easily leaves the fiber when waterdrops stick to the fiber and, as a result, the artificial leather shows a deteriorated flameproof finish. Moreover, when a large amount of the flame retarder is made to adhere to the fiber in order to increase the flameproof properties, not only does the artificial leather have a sticky feel on the fiber surface, but also the dye is likely to bleed. The colorfastness of the artificial leather is likely to be low.

There is an effective method for a flameproof finish in specific applications. For example, Japanese Unexamined Patent Publication (Kokai) No. 2002-38374 discloses an artificial leather to be used for CD curtains or the like. According to the patent publication, in order to satisfy the self-extinguishability in accordance with JIS D-1201 of an artificial leather for which a synthetic fiber is used, and prevent at the same time falling of the liquid drops, the flame retarder described in the patent publication must be imparted in an amount of 40% by weight or more. When an artificial leather to which the flame retarder is imparted in such a large amount, the artificial leather has a sticky feel on the surface, and the feel becomes poor. However, use of the artificial leather in a part human hands substantially do not touch, for example, a CD curtain used in the interior of a CD drive, causes no problem.

Japanese Unexamined Patent Publication (Kokai) No. 7-18584 discloses a method of mixing a flame retarder with polyurethane. Because the resultant polyurethane resin has a lowered resistance to light, the artificial leather cannot withstand be used for seats for vehicles that are required to have a particularly high resistance to light. In general, when a method of adding a flame retarder to a polyurethane is employed, making the flameproof properties and the resin properties compatible is difficult.

Japanese Unexamined Patent Publication (Kokai) No. 2002-105871 discloses a method of making fibers exhaust a phosphagen compound having a large phosphorus content in a bath also used for dyeing. The most difficult point of the method is contamination of the dyeing machine. When fibers are continuously dyed and exhausted in many batches, the interior of the dyeing machine is contaminated, and many contamination defects are formed on the fibers. Contaminants sticking to the interior of the dyeing machine are hardly removed by simple chemical cleaning, and the contaminants must be removed physically by disassembling and cleaning the dyeing machine. Moreover, because the environmental impact produced by polluted wastewater generated in the course of the removal is high, the industrial practice has many problems.

Japanese Unexamined Patent Publication (Kokai) No. 2004-131875 discloses an artificial leather prepared by filling an integrated material of an extremely fine fiber nonwoven fabric that is formed from a phosphorus copolymerized polyester with a small amount of a polymer elastic material. Japanese Unexamined Patent Publication (Kokai) Nos. 2002-115183 and 2002-294517 disclose an artificial leather prepared by filling an integrated material of an extremely fine fiber nonwoven fabric formed from a phosphorus copolymerized polyester with an aluminum hydroxide-containing polymer elastic material. Moreover, Japanese Unexamined Patent Publication (Kokai) No. 2002-201574 discloses an artificial leather prepared by filling an integrated material of an extremely fine fiber nonwoven fabric formed from a phosphorus copolymerized polyester with an organic phosphorus component-copolymerized polyurethane.

For the artificial leathers disclosed in these references, a phosphorus copolymerized polyester fiber is exposed to the top surface thereof, and is contacted with the external part during the use. Because the phosphorus copolymerized polyester fiber has poor resistances to light and abrasion in comparison with a polyester fiber formed from a homopolymer, exposure of the phosphorus copolymerized polyester fiber on the top surface of the artificial leather becomes an extremely great disadvantage in the application of the artificial leather to seats for vehicles.

In order to solve such a problem, a polyester fiber containing no flameproof component is used in Japanese Unexamined Patent Publication (Kokai) No. 2004-107840. Moreover, as described in Japanese Unexamined Patent Publication (Kokai) Nos. 2002-115183, 2002-294517, 2002-201574 and 2004-107840, when an organic solvent type polyurethane is used as a binder by a wet method, an impregnation amount of as large as 25% by weight or more based on the artificial leather base fabric is necessary.

Because polyurethane burns readily, an artificial leather having a larger impregnation amount of polyurethane becomes more disadvantageous with respect to flameproof properties. Accordingly, use of a polyurethane that is copolymerized with aluminum hydroxide or a phosphorus component has been proposed for the purpose of compensating for the deterioration of the flameproof properties. However, such a copolymerized polyurethane resin is not desirable because it is likely to be embrittled. Moreover, a sheet-like material obtained by applying such a technology has a very large fabric weight and, for example, in a weight of larger than 600 g/m², the resultant product becomes extremely heavy. The resultant artificial leather is not suited to the application for a seat for vehicles that is desirably lighten, as explained above.

Even when lightening an artificial leather, as described in Japanese Unexamined Patent Publication (Kokai) No. 2004-107840 or the like, by thinning it is tried, sufficient flameproof properties are hardly obtained for the reasons explained below. For artificial leathers having the same composition, an artificial leather having a thinner base fabric has a larger surface area per unit fabric weight to have a larger area to be contacted with the air. As a result, the artificial leather more readily burns because oxygen more readily supplied during burning.

As explained above, a technology capable of industrially and stably providing flameproof artificial leathers of suede finish that have a soft feel, that satisfy the severe requirements for resistances to light and abrasion such as those for seats for vehicles and that are lightweight, has not been developed yet.

DISCLOSURE OF THE INVENTION

Problems to be Solved by the Invention

An object of the present invention is to provide a flameproof artificial leather of suede finish that contains a phosphorus compound as a flame retarder, that contains neither halogen compounds, having chorine or bromine as their principal component, nor antimony compounds, that is excellent in a resistance to abrasion and lightfastness, and that has a light and soft feel.

Means for Solving the Problems

The present invention is as explained below.

1. A flameproof artificial leather comprising an artificial leather base fabric in which thermoplastic synthetic fibers are three dimensionally interlaced with each other and a water-soluble polyurethane resin, and having a layer (A) that is a surface layer and a layer (B) that is other than the layer (A), the fiber forming the layer A is an extremely fine thermoplastic synthetic fiber having a size of 0.5 dtex or less and excellent in a resistance to abrasion and/or a resistance to light, the extremely fine thermoplastic synthetic fiber being formed from a polyester homopolymer that has an intrinsic viscosity (IV) of 0.50 to 0.70, the content of the extremely fine thermoplastic synthetic fiber being from 10 to 60% by weight based on the artificial leather base fabric, at least one layer of the layer (B) having a phosphorus-containing flameproof thermoplastic synthetic fiber, the content of phosphorus being 0.09% by weight or more based on the artificial leather base fabric, the content of the water-soluble polyurethane resin being from 5 to 20% by weight based on the artificial leather base fabric.

2. The flameproof artificial leather according to claim 1, wherein the water-soluble polyurethane resin contains no flameproof component.

3. The flameproof artificial leather according to claim 1 or 2, wherein the resistance to abrasion measured in accordance with JIS L-1018 (E method: Martindale method) is 50,000 times or more.

4. The flameproof artificial leather according to claim 1 or 2, wherein the extremely fine thermoplastic synthetic fiber is formed from a polyester homopolymer having an intrinsic viscosity (IV) of from 0.50 to 0.63 and shows an excellent resistance to pilling.

5. The flameproof artificial leather according to any one of claims 1 to 4, wherein the flameproof thermoplastic synthetic fiber containing phosphorus is a phosphorus-containing polyester fiber.

6. The flameproof artificial leather according to claim 5, wherein the phosphorus-containing polyester fiber is a phosphorus copolymerized polyester fiber.

7. The flameproof artificial leather according to any one of claims 1 to 6, wherein the layer (B) has a scrim formed from a phosphorus-containing polyester fiber.

8. The flameproof artificial leather according to any one of claims 1 to 7, wherein the organic phosphorus flame retarder is imparted by after-treatment after dyeing.

The present invention will be explained below in detail.

The flameproof artificial leather of the present invention is of suede finish, and the artificial leather base fabric is a uniform nonwoven fabric sheet in which thermoplastic synthetic fibers are three dimensionally interlaced with each other. In addition, in the present invention, a surface layer refers to a layer that becomes the surface side when the artificial leather is used. For example, when the artificial leather is used for a chair, the surface layer is a layer of the side that is in contact with a human body.

For the flameproof artificial leather of the present invention, a layer (A) that is the surface layer has an extremely fine thermoplastic synthetic fiber of 0.5 dtex or less. In order to create a surface with an elegant suede finish, the size of the extremely fine thermoplastic synthetic fiber must be 0.5 dtex or less, preferably 0.35 dtex or less. The size is still more practically preferably from 0.06 to 0.2 dtex, in view of the fastness and durability.

In the present invention, the extremely fine thermoplastic synthetic fiber that forms the layer (A) is formed from a polyester homopolymer, and contains no phosphorus. The intrinsic viscosity (IV) of the polyester homopolymer is from 0.50 to 0.70, preferably from 0.50 to 0.63, more preferably from 0.55 to 0.63. In general, an excellent resistance to abrasion seems to conflict with an excellent resistance to pilling. However, when the intrinsic viscosity is in the above range, the resistance to abrasion can be made compatible with the resistance to pilling. The effects obtained by making the intrinsic viscosity fall in the above range are unexpected from the level of the conventional technology, and have been found for the first time by the present inventors.

The extremely fine thermoplastic synthetic fiber is used in the layer (A) in an amount of from 10 to 60% by weight based on the artificial leather base fabric. When the extremely fine thermoplastic synthetic fiber is used in a proportion in the above range while the intrinsic viscosity of the polyester that forms the fiber is kept in the above range, a sufficient resistance to abrasion can be obtained even with a small proportion, and both the resistance to abrasion and the flameproof properties of the artificial leather can be made satisfactory.

The extremely fine thermoplastic synthetic fibers can be produced by direct spinning. In order to produce a uniform nonwoven fabric sheet by three dimensionally interlacing the extremely fine thermoplastic synthetic fibers with each other, it is desired that the extremely fine thermoplastic synthetic fibers be produced by direct spinning, and used without further processing. However, the extremely fine thermoplastic synthetic fiber can be taken out from sea-island fibers, divided fibers or the like for which readily alkali-soluble copolymerized polyester, polystyrene or the like is used, and used. Moreover, a nonwoven fabric sheet of the extremely fine thermoplastic synthetic fiber can also be produced by preparing a nonwoven fabric sheet from the sea-island fibers, divided fibers or the like, and then extracting and removing the readily alkali-soluble component.

In addition, in the present invention, the extremely fine thermoplastic synthetic fiber that is a fiber forming the layer (A) is used in an amount of from 10 to 60% by weight based on the base fabric. In general, when the base fabric is made to contain a polyurethane resin to form an artificial leather, the resin is thought to be distributed over the entire artificial leather without significant nonuniformity. Accordingly, when it is assumed that the polyurethane resin uniformly adheres to the base fabric, it can be said that the layer (A) is a layer ranging from the surface of the artificial leather to a depth with the layer having an amount of from 10 to 60% by weight, and that the layer other than the layer (A) is the layer (B). For example, for an artificial leather that comprises, from the surface, a first layer having a fabric weight of 140 g/m$^2$, an intermediate second layer having a fabric weight of 100 g/m$^2$ and a back surface third layer having a fabric weight of 60 g/m$^2$ and that has a fabric weight of 300 g/m$^2$ as shown in FIG. 1, the surface first layer having a fabric weight of 140 g/m$^2$ becomes the layer (A), and the proportion of the layer (A) to the entire artificial leather is 47% by weight.

In the present invention, at least one layer of the layer (B) contains a flameproof thermoplastic synthetic fiber containing phosphorus, and the content of phosphorus is 0.09% by weight or more, preferably from 0.01 to 1.6% by weight, more preferably from 0.10 to 0.45% by weight based on the mass of the artificial leather. When the content of phosphorus is less than 0.09% by weight, the artificial leather is hardly evaluated to be self-extinguishing in the evaluation of flammability by JIS D-1201 or FMVSS-302.

Examples of the method of increasing the content of phosphorus that is in the above range, in the artificial leather base fabric include a method of increasing the phosphorus content of a flameproof thermoplastic synthetic fiber used in the layer (B), and a method of increasing the ratio of a flameproof thermoplastic synthetic fiber of the layer (B) by lowering the fabric weight of the surface layer (A). Although the former method has restrictions on the productivity of the spinning and the mechanical properties of the fiber, a flameproof thermoplastic synthetic fiber containing about 2.0% of phosphorus is commercially available, in general, and the phosphorus content can be increased by employing a sheath-core structure in which a phosphorus compound is used as a core, or the like structure. Moreover, in the latter method, lowering the fabric weight of the surface layer (A) causes problems of decreases in the resistances to light and abrasion of the artificial leather. In such cases, the use of an extremely fine thermoplastic synthetic fiber formed from a polyester that has an intrinsic viscosity (IV) as high as from 0.50 to 0.70 can maintain the resistances to light and abrasion even when the proportion of the layer (A) is decreased.

Examples of the flameproof thermoplastic synthetic fiber used for the layer (B) include a flameproof thermoplastic synthetic fiber for which a thermoplastic polymer copolymerized with a flame retarder is used, a flameproof thermoplastic synthetic fiber in which a flame retarder is kneaded in a thermoplastic polymer, and a thermoplastic synthetic fiber containing an exhausted flame retarder.

When the flameproof thermoplastic synthetic fiber in which a flame retarder is kneaded in a thermoplastic polymer is subjected to alkali reduction cleaning after dyeing, elution of the flame retarder, deterioration of the physical properties of the yarn, or the like takes place. Care should therefore be taken to suppress such phenomena. When the thermoplastic synthetic fiber in which a flame retarder is exhausted is dyed a deep color, the amount of the dye exhausted sometimes becomes insufficient because the flame retarder used behaves in the same manner as the dye in the fiber.

The flameproof thermoplastic synthetic fiber for which a thermoplastic polymer copolymerized with a phosphorus flame retarder is used causes no problems such as mentioned above, and is appropriate to the object of the present invention because the synthetic fiber can exhibit flameproof properties regardless of the dyeing conditions.

In the present invention, a phosphorus-containing polyester fiber is preferred as the flameproof thermoplastic synthetic fiber. Of the phosphorus-containing polyester fibers, a phosphorus copolymerized polyester fiber is more preferred. In addition, the phosphorus copolymerized polyester fiber sometimes shows a low melting point, low lightfastness, a low resistance to abrasion and low durability when subjected to bending. Accordingly, when the artificial leather of the invention is used in such a field that particularly requires the artificial leather to have durability as seats for vehicles, the resistances to light and abrasion are preferably maintained by using in the surface layer (A) an extremely fine thermoplastic synthetic fiber formed from a polyester homopolymer that has an intrinsic viscosity as high as from 0.50 to 0.70.

On the other hand, in view of the production cost, it is sometimes more preferred to use a flameproof thermoplastic synthetic fiber in which a phosphorus flame retarder is kneaded in the polymer, or a flameproof thermoplastic synthetic fiber in which a phosphorus flame retarder is exhausted in the fiber. The present invention is not restricted to only one of the above examples, and the effect of the present invention can be exhibited as long as the phosphorus content is in a range defined by the invention.

The phosphorus content in the phosphorus-containing polyester fiber is preferably 0.1% by weight or more, more preferably from 0.1 to 3.0% by weight, still more preferably from 0.1 to 2.0% by weight, particularly preferably from 0.5 to 2.0% by weight. When the content is in the above range, the following advantages are obtained: the mechanical properties of the yarn are good; less yarn breakage takes place during spinning; the industrial production of the artificial leather can be easily conducted; the content of phosphorus based on the artificial leather becomes adequate; and the excellent flameproof properties can be exhibited. In general, a phosphorus-containing polyester fiber is often produced with the phosphorus content being maintained at about 0.5% by weight.

A phosphorus-containing polyester fiber used for the layer (B) desirably has a size of 2.0 dtex or less. When a sheet for which a thick raw yarn having a size exceeding 2.0 dtex is employed is used, the static pressure during interlacing by a water flow does not rise and, as a result, a uniform and smooth sheet is sometimes hardly obtained. In order to obtain a smooth sheet that is necessary in such a field that requires the sheet to have a tear strength as the field of seats for vehicles and airplanes, a raw yarn having a size of from 0.5 to 1.1 dtex is preferred. When a raw yarn having a size of less than 0.5 dtex is used, the sheet has improved smoothness to further increase a feel of high grade, and therefore the use is sometimes effective depending on the applications. However, in a field where the tear strength is required, the strength sometimes becomes insufficient.

In the present invention, examples of the thermoplastic synthetic fiber include a polyester fiber, a nylon fiber and an acrylate fiber. Of these fibers, the polyester fiber is appropriate in view of the resistance to light, colorfastness, and the like.

Examples of the polyester include a poly(ethylene terephthalate), a poly(butylene terephthalate) and a poly(trimethylene terephthalate). However, the use of a highly applicable poly(ethylene terephthalate) is common.

In the present invention, the resistance to abrasion measured by the method of JIS L-1018 (E method: Martindale method) is preferably 50,000 times or more. For example, when the intrinsic viscosity (IV) (intrinsic viscosity of the polyester homopolymer) is 0.63, a resistance to abrasion that can withstand the Martindale test 65,000 times or more is obtained; when the intrinsic viscosity (IV) is 0.70, a resistance to abrasion that can withstand the Martindale test 75,000 times is obtained.

However, when the intrinsic viscosity (IV) exceeds 0.70, pills formed by abrasion become significant. The polyester then is not suited to applications in which the surface elegance is important. For example, when the thermoplastic synthetic fiber is used for such an application in which an abrasion load is extremely large as the seat surface of a chair, the produced pills are cut by friction and removed. Therefore, an excellent resistance to abrasion has a more significant merit.

In the present invention, a nonwoven fabric sheet in which thermoplastic synthetic fibers are three dimensionally interlaced with each other is used as a base fabric of the layer (A), and a similar nonwoven fabric sheet is also used as a base fabric of the layer (B). A nonwoven sheet is most preferably obtained by cutting a fiber to form short fibers, and directly forming a sheet by a papermaking method in which the short fibers are dispersed in water. The two sheets thus obtained are interlaced with each other by water flow to form an interlaced material. According to the method, an integrated sheet in which the composition of the layer (A) and that of the layer (B) are varied can be easily obtained.

Furthermore, when a scrim (to be explained later) is used, the scrim can be integrated and the degree of interlacing can be adjusted by adjusting the water pressure of the injection water flow. As a result, the function of the surface layer, that of the scrim and that of the back surface layer can be each definitely manifested. However, other interlacing methods such as needle punching can also be used to integrate and interlace such layers. Accordingly, in the present invention, methods of integrating and interlacing such layers are not restricted to water flow interlacing.

In the present invention, a scrim of a woven or knitted fabric can be used as one of the layer (B) in the artificial leather base fabric. When the layer (B) is formed from a plurality of layers, the scrim is preferably provided on the side contacted with the layer (A) (namely, an intermediate layer).

A woven or knitted fabric formed from a thermoplastic synthetic fiber for which a conventional polyester homopolymer is used, or a thermoplastic synthetic fiber for which a phosphorus-containing polyester polymer is used can be used as the scrim. These fibers can be suitably selected and used while the required flameproof properties are being taken into consideration.

The structure of the scrim can be either a knitted fabric structure or a woven fabric structure. When a knitted fabric is used, a fabric prepared by knitting in 22 to 28 gauge using a single knit machine is appropriate. When a woven fabric is used, higher dimensional stability and a higher strength can be realized. A textured yarn, a non-twisted yarn, or a twisted yarn with a twist of from 400 to 1,200 T/m is preferably used as a yarn for the woven fabric. Moreover, when a woven fabric is used, use of a phosphorus-containing polyester fiber as a weft yarn alone is also in the category of the present invention. The size of a yarn used for the scrim is from 55 to 220 dtex, and is selected in accordance with a necessary strength. When the scrim is used for such applications that require a high breaking strength and a high tear strength as seats for vehicles or airplanes, a raw yarn with a twist of about 800 T/m and a size of 110 dtex/48 f or more is preferably used.

In view of the production cost, it is desirable to use a phosphorus-containing polyester fiber in at least one layer of the layer (B) and a polyester homopolymer fiber for the scrim. However, when more excellent flameproof properties are required, a scrim for which a phosphorus-containing polyester fiber is used is preferably used to increase the concentration of phosphorus over the entire base fabric. In particular, a scrim formed from a phosphorus copolymerized polyester fiber is preferably used. With the use of the scrim, the scrim is designed so that a phosphorus-containing polyester fiber is picked as the warp yarn alone, or the weft yarn alone, or at every several yarns. Moreover, a phosphorus-containing polyester fiber may also be used for the scrim alone.

The flame retarding action of a phosphorus-containing polyester is principally a dehydration carbonizing action and a heat melting property of phosphorus compounds. The dehydration carbonizing action is a common action of a phosphorus type flame retarder, and is recognized as the extinguishing effect of the flame retarder. The dehydration carbonizing action is an extinguishing action produced by the phosphorus-containing polyester as explained below. Phosphoric acid contained in the molten polymer rapidly dehydrates and carbonizes the polymer to form a nonflammable carbonized layer. The layer shields the remaining polymer from a flame to show an extinguishing action. The heat melting property originates from the property of the phosphorus-containing polyester that the phosphorus-containing polyester more rapidly melts than an ordinary polyester fiber. As a result, when a flame approaches, the phosphorus-containing polyester can be more rapidly separated from a flame than the ordinary polyester. When the phosphorus-containing polyester had this property alone, liquid drops that fall would transfer the fire to other sites. It is therefore important to composite the dehydration carbonizing action and the heat melting property.

The extinguishing effect produced by the phosphorus compound include, in addition to the above ones, an effect produced by trapping radicals in a flame with volatilized phosphorus compounds during burning. Because the effect is produced by reactions taking place in a flame, observation of the reactions during an experiment is difficult. Dehydration carbonization, and heat melting properties produced by a phosphorus compound are principally observed during burning in the present invention. The effect of the present invention is therefore a synergistic one of the two actions. That is, when a flame approaches the base fabric, the base fabric is readily melted, and moves away from the fire source. The molten polymer is then dehydrated carbonized, and the remaining base fabric is covered with a nonflammable carbonized layer. To stop burning readily, by such a process, is the flame retarding action according to the present invention.

The content of a water-soluble polyurethane resin in the flameproof artificial leather of the present invention is from 5 to 20% by weight, more preferably from 7 to 14% by weight based on the artificial leather basic fabric. When the content is in the above range, the artificial leather can be made to have an excellent soft feel and durability.

A polyurethane generates a large amount of gas when thermally decomposed, whereas a polyester is readily melted when contacted with a flame. It is therefore difficult to make those artificial leathers flameproof which are materials prepared from a polyester and a polyurethane in combination. The present inventors have made investigations to prepare a flameproof artificial leather while the types and concentrations of a flameproof polyester fiber and a polyurethane are being varied. As a result, they have found that the flameproof properties can be achieved by using a water-soluble polyurethane emulsion as a polyurethane, and making the content of the water-soluble polyurethane resin fall in a range from 5 to 20% by weight based on the artificial leather base fabric, although the use of an organic solvent type polyurethane cannot attain the flameproof properties.

In general, when the content of the polyurethane resin is increased, the artificial leather is likely to burn, and the flameproof properties are deteriorated. In order to make an artificial leather containing the polyurethane flameproof, it is therefore an extremely important factor to make the polyurethane have a strong bonding force per unit amount of the polyurethane resin contained.

Because a water-soluble polyurethane resin has a strong bonding force in comparison with an organic solvent type polyurethane resin, the water-soluble polyurethane resin can satisfy the requirement that the resin should act as a binder of the artificial leather even when the content in terms of a solid component is as small as 10% by weight or less.

On the other hand, for an organic solvent type polyurethane resin, when the content is 20% by weight or less, the resultant artificial leather not only hardly maintains the resistance to abrasion but also it is poor in resilient touch and has a poor fabric-like feel. Moreover, for an artificial leather for which a scrim is not used in the base fabric, a content of 30% by weight or more is necessary even when the content is the lowest because its strength for maintaining the form is not sufficient.

The use of a scrim greatly improves a physical strength, such as a breaking strength and a tear strength, of the artificial leather. The polyurethane is therefore principally required to improve an excellent feel and a resistance to abrasion when a scrim is used. The content of the polyurethane in the artificial leather can therefore be made low.

Although there is no specific limitation on the method of making the artificial leather contain a polyurethane resin, the use of an impregnation method is preferred.

When an artificial leather is impregnated with a water-soluble polyurethane emulsion and the emulsion is solidified, the surface area of the polyurethane resin thus formed greatly influences the flameproof properties of the artificial leather. Because an organic solvent type polyurethane forms a sponge-like expanded structure during solidification in the water bath, the area of the polyurethane to be contacted with the air becomes very large. As a result, the polyurethane significantly easily burns. When a water-soluble polyurethane emulsion is solidified to form a polyurethane resin, the polyurethane resin has a dense structure in comparison with the expanded structure formed by the organic solvent type polyurethane. The artificial leather impregnated with the water-soluble polyurethane emulsion therefore shows greatly improved flameproof properties when compared with the artificial leather impregnated with the same amount of an organic solvent type polyurethane resin.

As explained above, when an organic solvent type polyurethane resin is used, a larger impregnation amount is required in view of the strength of the artificial leather. Moreover, because the polyurethane resin has a sponge type expanded structure, the surface area contacted with the air increases. The organic solvent type polyurethane is therefore hardly made flameproof in comparison with a water-soluble polyurethane resin that comes to have a dense structure. For the above reasons, when the organic solvent type polyurethane resin is used for the artificial leather, a flameproof component must be added to the polyurethane resin in order to obtain sufficient flameproof properties. In contrast to the above polyurethane resin, when a water-soluble polyurethane resin is used, addition of a flameproof component to the resin is not necessary. The water-soluble polyurethane resin therefore has the advantage that the resin can have adequate flameproof properties without the addition of a flame retarder.

The water-soluble polyurethane is desirably solidified by a method of solidification by heat gelatinization with a neutral salt as disclosed in Japanese Patent No. 3047951 that has been granted to the present inventors.

Examples of the composition of the water-soluble polyurethane resin component in the present invention include polyol components such as polyester diols (such as polyethylene adipate glycol), polyether glycols (such as polyethylene glycol and polytetramethylene glycol) and polycarbonate diols, isocyanate components such as aromatic diisocyanates (such as diphenylmethane-4,4-diisocyanate), alicyclic diisocyanates (such as dicyclohexylmethane-4,4-diisocyanate and aliphatic diisocyanates (such as hexamethylene diisocyanate), and chain extenders such as glycols (such as ethylene glycol) and diamines (such as ethylenediamine and 4,4-diaminodiphenylmethane).

In the present invention, a starting material for a polyurethane can be prepared by suitably selecting the above various components in combination. A non-yellowing polyurethane formed from a polycarbonate diol is desirable particularly when significantly excellent flameproof properties are required. Incorporation of a heat-resistant antioxidant such as a hindered amine or a hindered phenol in a polyurethane emulsion or within a polymer chain does not impair the effect of the present invention.

The addition of a flame retarder to a polyurethane causes no problem as long as the addition neither deteriorates the properties of the polyurethane resin nor influences the peeling of the polyurethane resin particularly in a dyeing step. However, in general, the addition of the flame retarder often deteriorates the film-forming properties of the resin, and exerts a significantly baneful influence. For example, the addition accelerates the peeling of the polyurethane resin in the dyeing step. Accordingly, the addition is frequently not suited to an industrially continuous production. In the present invention, the artificial leather can demonstrate an adequate flameproof effect even when a flame retarder is not added to the polyurethane.

The raw fabric of the flameproof artificial leather in the present invention is dyed with a jet dyeing machine, and is reduction cleaned to give a product. The raw fabric is most desirably dyed by jet dyeing in view of the effect produced by gigging with a jet nozzle, the improvement of the commercial value produced by the crumpling effect of the fabric and the productivity. When a fiber formed from a thermoplastic polymer that is copolymerized with phosphorus is used, the raw fabric can have flameproof properties efficiently because the flame retarder never leaves in the dyeing step. Moreover, because the fiber of the layer (A) that is the surface layer is an extremely fine fiber formed from a polyester homopolymer, the color development of the fabric is well reproduced, and the object of the present invention is sufficiently achieved.

A common alkali reduction formulation such as thiourea dioxide and sodium hydroxide, or sodium hydrosulfite and sodium carbonate can be applied to the reduction cleaning. The reduction treatment is preferably conducted at an appropriate concentration so that various color fastness such as color fastness to washing, fastness to dry cleaning or fastness to wet friction are not lowered. In general, thiourea dioxide and sodium hydroxide each in a concentration of from 1 to 8 g/liter determined in accordance with the dye concentration are used for the reduction cleaning.

Imparting, further, an organic phosphorus flame retarder to the flameproof artificial leather of the present invention in the after treatment step subsequent to dyeing is effective means for giving the artificial leather a property of preventing liquid drops of the burning material from falling (a non-drop property) that is one of the flameproof properties. In this case in the present invention, an adequate flameproof effect can be obtained with an organic phosphorus flame retarder in an amount as extremely small as ¼ of the amount of an organic phosphorus flame retarder that has been used in the prior technologies. As a result, the flameproof artificial leather thus obtained in the present invention shows neither a sticky feel nor a lowering of colorfastness caused by bleeding.

Appropriate examples of the organic phosphorus flame retarder include polyphosphoric acid carbamate, formalin condensation products of guanidine phosphate and guanidine phosphate. A method of imparting the organic phosphorus flame retarder in an after treatment step is carried out by, for example, impregnating the base fabric with a diluted solution of the above organic phosphorus flame retarder after dyeing, squeezing the impregnated base fabric at a pick-up ratio of from 50 to 100%, and drying at a temperature of from 80 to 120° C. so that the impregnated fabric is finished. A net dryer or a pin tenter can be suitably used for drying.

BEST MODE FOR CARRYING OUT THE INVENTION

Figure 1:
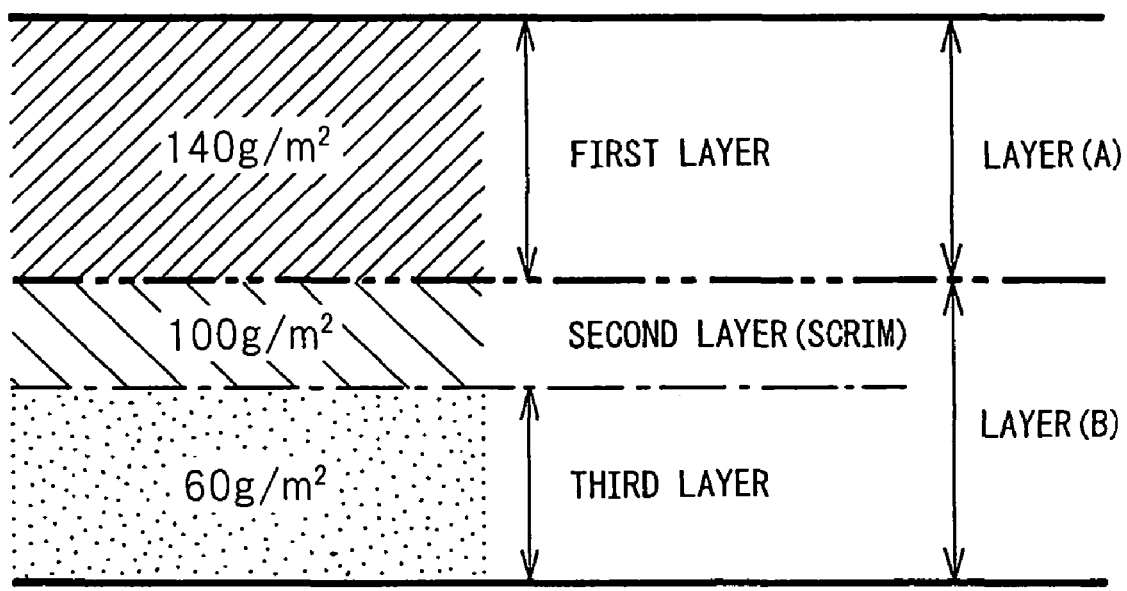
FIG. 1 is an explanatory view of a layer (A) and a layer (B) in one embodiment of the artificial leather of the present invention.

The present invention is further explained below by making reference to examples. However, the present invention is in no way restricted thereto.

In addition, methods of measurements and evaluations made in the examples are as explained below.

(1) Flammability

The flammability test is conducted in accordance with JIS D-1021. When a sample shows self-extinguishability in the test method, the sample is defined as having a level of flame retardancy.

The after flame time after separating a burner flame from the sample is noted as a reference for comparing base fabrics having self-extinguishability. The criteria of the flameproof properties are as described below:

a third grade of low flammability: a sample having a burning rate of greater than 75 mm/min and 100 mm/min or less, a second grade of low flammability: a sample having a burning rate of greater than 50 mm/min and 75 mm/min or less, and a first grade of low flammability: a sample having a burning rate of 50 mm/min or less.

The following samples are defined as having self-extinguishability: (1) a sample does not burn to the reference line and ceases to burn; and (2) the sample ceases to burn while the burnt length is 50 mm or less. In addition, for a sample that ceases to burn within 60 sec, the number of seconds necessary for the ceasing of the burning is indicated.

(2) Resistance to Abrasion

The resistance to abrasion is measured in accordance with JIS L-1018 (E method: Martindale method). The pressing load is 12 kPa.

The test results are evaluated according to the following criteria:

L: a scrim as an intermediate layer is exposed after making an abrasion movement 50,000 times, or a hole 0.5 mm or more in diameter produced by abrasion penetrates the back surface when there is no scrim;

M: the scrim as an intermediate layer is not exposed after abrasion 50,000 times, or a hole 0.5 mm in diameter produced by abrasion does not penetrate the back surface when there is no scrim;

H: the degree of abrasion is the same as the M mentioned above, and the reduction of weight is 15 mg or less.

(3) Resistance to Pilling

During the abrasion test in (2) mentioned above, the number of pills having a diameter of 1 mm or more and produced after making an abrasion movement 10,000 times is counted. The test is conducted 6 times, and the average value is determined. The evaluation is made according to the following criteria:

H: the number of pills is less than 1;

M: the number of pills is 1 or more and less than 3; and

L: the number of pills is 3 or more.

(4) Resistance to Light

Using an SC 700FT type testing machine (manufactured by Suga Test Instruments K.K., irradiance of 150 W/m$^2$, wavelength of 300 to 400 nm), a sample is subjected to 38 test cycles each consisting of irradiation of the sample at 73±3° C. for 3.8 hours and non-irradiation at 38±3° C. for 1.0 hour. The discoloration of the sample is judged according to the gray scale for discoloring/fading (JIS L-0804). Those samples that are judged third grade or more are accepted.

(5) Content of Phosphorus

A dyed artificial leather is washed with water, dried, weighed and decomposed by the sulfuric acid-nitric acid method. The resultant material is quantitatively analyzed with an ICP emission spectral analyzer, and the results are shown in terms of mass %.

(6) Intrinsic Viscosity (IV)

The intrinsic viscosity (IV) (dl/g) is a value obtained on the basis of a definition by the following formula:

$$[\eta] = \lim(\eta_r - 1)/C \quad C \to 0 \qquad \text{[Formula 1]}$$

wherein $\eta_r$ is a value obtained by dividing the viscosity of a diluted solution of a polymer at 35° C. in an o-chlorophenol solvent having a purity of 98% or more by the viscosity of the above solvent measured at the same temperature, and C is a polymer concentration defined in terms of g/100 ml.

(7) Overall Judgment

The overall judgment is as follows:

H: the sample is self-extinguishing in a flammability test, very good in both resistance to abrasion and resistance to pilling, and is good in resistance to light test;

M: the sample is self-extinguishing in a flammability test, good or very good in both resistance to abrasion and resistance to pilling, and good in a resistance to light resistance but does not correspond to "very good" mentioned above; and L: the sample corresponds to neither H, nor M mentioned above.

Examples 1 to 11, Comparative Examples 1 to 4

Short fibers prepared by cutting into a 5 mm length an extremely fine polyester fiber having a single fiber size of 0.2 dtex and obtained by direct spinning a polyester homopolymer resin that had an intrinsic viscosity (IV) of 0.63 were used for the surface first layer (layer (A)) of an artificial leather base fabric. Moreover, a phosphorus copolymerized polyester fiber (containing 0.5% by weight of phosphorus) having a single fiber size of 0.7 dtex was cut into a 10 mm length to give short fibers. A polyester homopolymer fiber having a single fiber size of 0.7 dtex was cut into a 10 mm length to give short fibers. The copolymerized short fibers and the homopolymer short fibers were mixed in a mass ratio of 0:10, 4:6, 6:4, 8:2 or 10:0, and the resultant mixture was used for the back surface third layer (see Table 1).

These short fibers were dispersed in water, and a sheet (140 g/m$^2$) for the surface first layer (layer (A)) and a sheet (60 g/m$^2$) for the back surface third layer were produced by a papermaking method.

A polyester woven fabric formed from a fiber of 166 dtex/48 f and having a fabric weight of 100 g/m$^2$ was inserted as a second layer (scrim) to become an intermediate layer between the sheet for the surface first layer and the sheet for the back surface third layer to give a three-layered structure base fabric. The three-layered structure base fabric was interlaced by injection of a high speed water flow to give a three dimensional interlaced nonwoven fabric. The following three types of woven fabrics (see Table 1) were used for the second layer as scrims: a woven fabric for which a polyester homopolymer fiber was used as a warp yarn and a weft yarn; a woven fabric for which a polyester homopolymer fiber was used as a warp yarn and a phosphorus copolymerized polyester fiber (containing 0.5% by weight of phosphorus) was used as a weft yarn; and a woven fabric for which a phosphorus copolymerized polyester fiber (containing 0.5% by weight of phosphorus) was used as a warp yarn and a weft yarn.

In addition, in each example, the proportion of the extremely fine polyester fiber in the layer (A) was 47% by weight based on the entire base fabric.

The surface of the three-layered structure base fabric thus obtained was buffed with #400 sandpaper. The buffed base fabric was immersed in an aqueous polyurethane emulsion containing 3% by weight of sodium sulfate as a heat sensitizer and 6% by weight of a polycarbonate polyurethane as a polyurethane solid component. The immersed base fabric was squeezed with a mangle roller so that the proportion of the polyurethane solid component became 7% by weight. The squeezed base fabric was heated and dried at 140° C. for 3 minutes with a pin tenter drying machine.

The raw fabric of the artificial leather thus obtained was dyed at 130° C. with a jet dyeing machine to give an artificial leather. A blue disperse dye was used. The artificial leathers thus obtained were each excellent in elegant surface properties and a flexible feel.

Table 1 shows the results of testing the flammability, resistance to abrasion, resistance to pilling and resistance to light of the artificial leathers thus obtained.

As a result of the flammability test, the artificial leathers in Examples 1 to 11 each having a phosphorus content of 0.1% by weight or more based on the entire base fabric were judged to be self-extinguishing in the JIS D-1201 test because the burning flame was self-extinguished before the reference line. The artificial leathers in Comparative Examples 1 to 4 each having a phosphorus content of 0.08% by weight or less based on the entire leather showed the effects of flame retardancy such as lowering of a burning rate. However, the leathers were not judged to be self-extinguishing.

In the abrasion test of the entire artificial leathers, neither scrims as intermediate layers were exposed after making an abrasion movement 50,000 times, nor did pilling take place. The test for a resistance to light showed that the leathers were as good as the third grade, and the leathers were found to have resistances to abrasion and light suitable for leathers to be used as sheet materials.

Comparative Examples 5 to 10

Short fibers prepared by cutting into a 5 mm length an extremely fine phosphorus copolymerized polyester fiber (containing 0.5% by weight of phosphorus) having a single fiber size of 0.2 dtex were used for the surface first layer of an artificial leather base fabric in an amount of 100% by weight. Alternatively, a mixture of the above short fibers and the short fibers prepared from the extremely fine polyester fibers used in Example 1 (containing the latter short fibers in an amount of 50% by weight) was also used for the surface first layer. Moreover, a phosphorus copolymerized polyester fiber (containing 0.5% by weight of phosphorus) having a single fiber size of 0.7 dtex was cut into a 10 mm length to give short fibers. A polyester homopolymer fiber having a single fiber size of 0.7 dtex was cut into a 10 mm length to give short fibers. The former short fibers and the latter short fibers were mixed in a mass ratio of 0/10, 5/5 or 10/0, and used for the back surface second layer (see Table 2).

A two-layered structure base fabric was prepared in the same manner as in Example 1, and an artificial leather was prepared therefrom in the same manner as in Example 1.

Although the obtained artificial leather has 140 g/m$^2$ of the fabric weight in the surface layer and has 60 g/m$^2$ of the fabric weight in the back surface layer thus obtained, the resistance to light of the artificial leather was insufficient because the leather had no layer composed of an extremely fine thermoplastic synthetic fiber (namely, layer (A) according to the present invention).

Table 2 shows the results of testing the flammability, resistance to light, resistance to abrasion, and resistance to light of the artificial leathers thus obtained. Although these artificial leathers were all self-distinguishing, the resistance to light was of the first grade.

Furthermore, although no pilling took place in testing a resistance to abrasion, the intermediate layer scrim was exposed prior to making an abrasion movement 50,000 times. Although these artificial leathers were self-extinguishing, they showed poor resistances to abrasion and light as sheet materials, and did not provide a degree of practical use.

Examples 12 to 19, Comparative Examples 11 to 20

Short fibers prepared by cutting into a 5 mm length an extremely fine polyester fiber having a single fiber size of 0.2 dtex and obtained by direct spinning a polyester homopolymer that had an intrinsic viscosity (IV) of 0.63 were used for the surface first layer (layer (A)) of an artificial leather base fabric. Moreover, short fibers prepared by cutting into a 10 mm length a phosphorus copolymerized polyester fiber (containing 0.5% by weight of phosphorus) having a single fiber size of 0.7 dtex was used for the back surface third layer thereof. A sheet for the first layer and a sheet for the third layer were prepared in the same manner as in Example 1.

A polyester woven fabric having a fabric weight of 100 g/m² and formed from a polyester homopolymer fiber of 166 dtex/48 f as a warp yarn and a phosphorus copolymerized polyester fiber (containing 0.5% by weight of phosphorus) of 166 dtex/48 f as a weft yarn was used for the intermediate second layer.

The woven fabric for the second layer was inserted between the sheet for the first layer and the sheet for the third layer to give a three-layered structure base fabric. The fabric weights of the base fabric thus obtained are explained below. The first layer (layer (A)) had a fabric weight of 140 g/m², the second layer 100 g/m², and the third layer 60 g/m² (total fabric weight of 300 g/m²). In addition, the proportion of the extremely fine polyester fiber in the layer (A) was 47% by weight based on the entire base fabric.

The three-layered structure base fabric was buffed in the same manner as in Example 1, and treated with an aqueous emulsion of polycarbonate polyurethane, an aqueous emulsion of polyether polyurethane or a solution of polyether polyurethane in dimethylformamide, as a polyurethane to give an artificial leather. In addition, when an aqueous emulsion was used, the base fabric was treated in the same manner as in Example 1. When a solution in dimethylformamide was used, the base fabric was impregnated with polyurethane by the commonly used water bath solidification method. During the process, the adhesion ratio of polyurethane was adjusted to become 3, 5, 7, 14, 20 or 25% by weight based on the fabric weight.

Table 3 shows the results of testing the flammability, resistance to abrasion and resistance to light of the artificial leathers thus obtained.

Of these artificial leathers, the following each showed self-extinguishability before the reference line in a flammability test: those artificial leathers for which a polycarbonate aqueous polyurethane emulsion had been used and to which a polyurethane had adhered in an adhesion ratio of 20% by weight or less (Comparative Example 11, Examples 12 to 15); those artificial leathers for which a polyether polyurethane water-soluble emulsion had been used and to which polyurethane had adhered in an adhesion ratio of 20% by weight or less (Comparative Example 13, Examples 16 to 19); and those artificial leathers for which a dimethylformamide (DMF) solution of polyether polyurethane had been used and to which polyurethane had adhered in an adhesion ratio of 5% by weight or more (Comparative Examples 15 to 16). However, although the artificial leathers in Comparative Examples 11, 13, 15 and 16 were self-distinguishing, they have problems with the feel and a resistance to abrasion, and did not provide a degree of practical use.

The artificial leathers in Examples 12 to 15 and Examples 16 to 19 each showed no exposure of the intermediate layer scrim after making an abrasion movement 50,000 times in testing a resistance to abrasion, each had a resistance to light as good as third grade, and were found to have each self-extinguishability, a resistance to abrasion, a resistance to pilling and a resistance to light, suitable for a sheet material.

Examples 20 to 33

Short fibers prepared by cutting into a 5 mm length an extremely fine polyester fiber having a single fiber size of 0.2 dtex and obtained by direct spinning a polyester homopolymer resin that had an intrinsic viscosity (IV) of 0.63 were used for the surface first layer (layer (A)) of an artificial leather base fabric. Moreover, short fibers prepared by cutting into a 10 mm length a phosphorus copolymerized polyester fiber (containing 0.5% by weight of phosphorus) having a single fiber size of 0.7 dtex were used for the back surface third layer thereof. A sheet for the first layer and a sheet for the third layer were prepared from the above two types of short fibers in the same manner as in Example 1.

A polyester woven fabric having a fabric weight of 100 g/m² and formed from a polyester homopolymer fiber of 166 dtex/48 f as a warp yarn and a phosphorus copolymerized polyester fiber (containing 0.5% by weight of phosphorus) of 166 dtex/48 f as a weft yarn was used for the intermediate second layer.

The woven fabric for the second layer was inserted between the sheet for the first layer and the sheet for the third layer, and a three-layered structure base fabric was prepared in the same manner as in Example 1. The base fabric thus obtained had the following fabric weights. The first layer (layer (A)) had a fabric weight of 140 g m², the second layer had a fabric weight of 100 g/m², and the third layer had a fabric weight of 60 g/m² (total fabric weight of 300 g/m²). In addition, the proportion of the extremely fine polyester fiber in the layer (A) was 47% by weight based on the entire base fabric.

The thus obtained base fabrics each having a three-layered structure were impregnated with a water-soluble polyurethane emulsion to give raw fabrics of artificial leathers each having a solid component in an amount of 7% by weight. The raw fabrics were then dyed, and immersed in a solution containing an organic phosphorus flame retarder (P-205: Nicca Fi-None P-205 manufactured by Nicca Chemical Co., Ltd.) containing guanidine phosphate as a principal component and 10% by weight of phosphorus in terms of atomic concentration and an organic phosphorus flame retarder (P-72: Nicca Fi-None P-72 manufactured by Nicca Chemical Co., Ltd.) containing polyphosphoric acid carbamate as a principal component and 10% by weight of phosphorus in terms of atomic concentration (both retarders being contained in a total amount of from 0.5 to 20% by weight). The immersed raw fabrics were squeezed with a mangle roller so that the pick-up ratio became 100%, and dried for 3 minutes with a pin tenter drying machine set at 110° C. to give artificial leathers.

Table 4 shows the results of testing the flammability of the artificial leathers thus obtained.

The artificial leathers in Examples 20 to 33 were all self-extinguishing, and each showed an after-flame time of 0 sec. Moreover, in Examples 24 to 26 and Examples 31 to 33 wherein a flame retarder concentration of 10% by weight owf or more (phosphorus atomic concentration of 1% owf or more) was used, the falling of liquid drops could be prevented. Those artificial leathers which had been obtained by using a flame retarder concentration of 20% by weight or more owf each had a feel that was stiff to some extent. However, the stiff feel caused no problem in practical use.

Examples 34 to 37, Comparative Examples 21 and 22

A sheet prepared by a papermaking method and having a fabric weight of 60 g/m² was used for each of the first to the fifth layer from the surface of an artificial leather base fabric. As shown in Table 5, short fibers prepared by cutting into a 5 mm length an extremely fine polyester fiber (single fiber size of 0.2 dtex) that was obtained by direct spinning a polyester homopolymer resin having an intrinsic viscosity (IV) of 0.63, or short fibers prepared by cutting into a 5 mm length an extremely fine phosphorus copolymerized polyester fiber (containing 0.5% by weight of phosphorus) of a single fiber size of 0.2 dtex were used for sheets for the first to the third layer. Moreover, short fibers obtained by cutting into a 10 mm length a polyester homopolymer fiber having a single fiber size of 0.7 dtex or a phosphorus copolymerized polyester fiber (containing 0.5% by weight of phosphorus) having a single fiber size of 0.7 dtex were used for the fourth and the fifth layer.

Sheets prepared by a papermaking method for the first to the fifth layer were stacked as shown in Table 5, and interlaced in the same manner as in Example 1 to give a base fabric. In addition, the portion of the first to the third layer in each of Examples 34 and 35 was the layer (A). The portion of the first and the second layer in Example 36 was the layer (A). The portion of the first layer in Example 37 was the layer (A). Accordingly, the proportion of the extremely fine polyester fiber forming the layer (A) to the base fabric was as shown in Table 5.

Artificial leathers were obtained from the base fabrics thus obtained, in the same manner as in Example 1. Table 5 shows the results of testing the flammability, resistance to abrasion and resistance to light of the artificial leathers thus obtained.

The artificial leather in Comparative Example 21 was not self-extinguishing. The artificial leathers in Examples 34 to 37 and Comparative Example 22 were self-extinguishing. However, the one in Comparative Example showed a resistance to light as low as the first grade because the proportion of the layer (A) was 0%.

The results of testing the resistance to abrasion are explained below. The artificial leathers in Comparative Example 21 and Examples 34 to 36 each showed abrasion of the extremely fine polyester fiber layer alone in the layer (A). The artificial leather in Example 37 withstood an abrasion movement made 50,000 times although the flameproof polyester fiber layer was exposed. However, the artificial leather in Comparative Example 22 was worn off prior to an abrasion movement made 50,000 times, and the sample holder of the testing apparatus was exposed. In addition, no pilling took place in Examples 34 to 37 and Comparative Examples 21 and 22.

The artificial leathers in Examples 34 to 37 in which each layer (A) was formed from an extremely fine polyester fiber and which each had a phosphorus content of from 0.10 to 0.40% by weight based on the base fabric were each found to be excellent in flame retardancy and have resistances to abrasion, pilling and light suitable for a sheet material.

Examples 38 to 43

Sheets prepared by a papermaking method were used for the first, the second and the fourth layer from the surface of each artificial leather base fabric. Short fibers prepared by cutting into a 5 mm length an extremely fine polyester fiber (having a single fiber size of 0.2 dtex) that was obtained by direct spinning a polyester homopolymer resin having an intrinsic viscosity (IV) of 0.50, 0.63 or 0.70 were used for the first layer (layer (A)). Short fibers prepared by cutting into a 5 mm length an extremely fine phosphorus copolymerized polyester fiber (containing 0.5% by weight of phosphorus) having a single fiber size of 0.2 dtex were used for the second layer. Moreover, short fibers obtained by cutting into a 10 mm length a phosphorus copolymerized polyester fiber (containing 0.5% by weight of phosphorus) having a single fiber size of 0.7 dtex were used for the fourth layer.

Furthermore, the same woven fabric formed from a phosphorus copolymerized polyester fiber as one used in Examples 7 to 11 was used for the third layer.

Sheets prepared by a papermaking method for the first, the second and the fourth layer were stacked as shown in Table 6, and interlaced in the same manner as in Example 1 to give a base fabric. In addition, the proportion of the extremely fine polyester fiber in the layer (A) to the entire base fabric was from 10 to 30% by weight as shown in Table 6.

Artificial leathers were obtained from the base fabrics thus obtained in the same manner as in Example 1.

Table 6 shows the results of testing the flammability and the resistances to abrasion, pilling and light of the artificial leathers thus obtained. The artificial leathers in Examples 38 to 43 were all self-extinguishing. The results of testing the resistance to abrasion are explained below. The artificial leathers in Examples 38 to 43 withstood an abrasion movement done 50,000 times, to give good results. The artificial leathers in Examples 42 and 43 each showed a very excellent resistance to abrasion although one to two pills were formed. However, the degree of pilling caused no problem when the artificial leathers were not used in a field where the surface elegance thereof was important.

The artificial leathers in Examples 38 to 43 in which each layer (A) was formed from an extremely fine polyester fiber that was prepared from a polyester homopolymer resin, which each had a content of the polyester fiber of from 10 to 30% by weight and which each had a phosphorus content of from 0.35 to 0.45% by weight based on the entire base fabric were each found to be excellent in flame retardancy and have resistances to abrasion, pilling and light suitable for a sheet material.

Examples 44 to 47

A sheet prepared by a papermaking method and having a fabric weight of 60 g/m$^2$ was used for each of the first to fifth layer from the surface of each of the artificial leather fabrics. An extremely fine polyester fiber obtained by direct spinning a polyester homopolymer resin that had an intrinsic viscosity (IV) of 0.63 and having a single fiber size of 0.2 dtex was used for the first layer (layer (A)). Short fibers prepared by cutting into a 5 mm length an extremely fine phosphorus copolymerized polyester fiber containing from 0.5 to 2.0% by weight of phosphorus and having a single fiber size of 0.2 dtex were used for the second and the third layer. Moreover, short fibers prepared by cutting into a 10 mm length a phosphorus copolymerized polyester fiber (containing from 1.0 to 2.0% by weight of phosphorus) that had a single fiber size of 0.7 dtex were used for the fourth and the fifth layer.

Sheets prepared by a papermaking method for the first to the fifth layer were stacked as shown in Table 7, and interlaced in the same manner as in Example 1 to give a base fabric. In addition, the proportion of the extremely fine polyester fiber in the layer (A) to the base fabric was 20% by weight.

Artificial leathers were obtained from the base fabrics thus obtained in the same manner as in Example 1.

Table 7 shows the results of testing the flammability, resistance to abrasion and resistance to light of the artificial leathers in Examples 44 to 47.

The artificial leathers in Examples 44 to 47 were all self-extinguishing. As a result of testing the resistance to abrasion, the artificial leathers in Examples 44 to 47 withstood an abrasion movement 50,000 times although the flameproof polyester fiber layers were exposed. Moreover, the artificial leathers in Examples 44 to 47 all showed that no pilling took place during the test.

The artificial leathers in Examples 44 to 47 in which the layers (A) were formed from an extremely fine polyester fiber of a polyester homopolymer resin, which each had a content of the extremely fine polyester fiber of 20% by weight and which each had a phosphorus content of from 0.10 to 1.60% by weight based on the entire base fabric were each found to be excellent in flame retardancy and have resistances to abrasion, pilling and light suitable for a sheet material.

TABLE 1

| | Second layer (scrim) | | Amount of phosphorus copolymerized fiber in third layer (wt. %) | Phosphorus content of base fabric (wt. %) | Amount of fiber in layer (A) based on base fabric (wt. %) |
|---|---|---|---|---|---|
| | Warp | Weft | | | |
| Comp. Ex. 1 | Homopolymer polyester | Homopolymer polyester | 0 | 0 | 47 |
| Comp. Ex. 2 | | | 40 | 0.05 | 47 |
| Comp. Ex. 3 | | | 60 | 0.07 | 47 |
| Ex. 1 | | | 80 | 0.1 | 47 |
| Ex. 2 | | | 100 | 0.12 | 47 |
| Comp. Ex. 4 | Homopolymer polyester | Flameproof polyester | 0 | 0.08 | 47 |
| Ex. 3 | | | 40 | 0.14 | 47 |
| Ex. 4 | | | 60 | 0.16 | 47 |
| Ex. 5 | | | 80 | 0.19 | 47 |
| Ex. 6 | | | 100 | 0.21 | 47 |
| Ex. 7 | Flameproof polyester | Flameproof polyester | 0 | 0.20 | 47 |
| Ex. 8 | | | 40 | 0.25 | 47 |
| Ex. 9 | | | 60 | 0.27 | 47 |
| Ex. 10 | | | 80 | 0.30 | 47 |
| Ex. 11 | | | 100 | 0.32 | 47 |

| | Results of flammability test | | | | | | |
|---|---|---|---|---|---|---|---|
| | Burning rate (mm/min) | After flame time (sec) | Grade | Resistance to abrasion | Resistance to pilling | Resistance to light | Overall judgment |
| Comp. Ex. 1 | 95 | — | Third | H | H | M | L |
| Comp. Ex. 2 | 83 | — | Third | H | H | M | L |
| Comp. Ex. 3 | 72 | — | Second | H | H | M | L |
| Ex. 1 | 0 | 22 | S-e* | H | H | M | H |
| Ex. 2 | 0 | 15 | S-e* | H | H | M | H |
| Comp. Ex. 4 | 72 | — | Second | H | H | M | L |
| Ex. 3 | 0 | 20 | S-e* | H | H | M | H |
| Ex. 4 | 0 | 10 | S-e* | H | H | M | H |
| Ex. 5 | 0 | 8 | S-e* | H | H | M | H |
| Ex. 6 | 0 | 3 | S-e* | H | H | M | H |
| Ex. 7 | 0 | 8 | S-e* | H | H | M | H |
| Ex. 8 | 0 | 5 | S-e* | H | H | M | H |
| Ex. 9 | 0 | 5 | S-e* | H | H | M | H |
| Ex. 10 | 0 | 0 | S-e* | H | H | M | H |
| Ex. 11 | 0 | 0 | S-e* | H | H | M | H |

Note:
S-e* = Self-extinguishing

TABLE 2

| | Amount of phosphorus copolymerized fiber in first layer (wt. %) | Amount of phosphorus copolymerized fiber in second layer (wt. %) | Phosphorus content of base fabric (wt. %) | Amount of fiber in layer (A) based on base fabric (wt. %) |
|---|---|---|---|---|
| Comp. Ex. 5 | 50 | 0 | 0.19 | 0 |
| Comp. Ex. 6 | 50 | 50 | 0.25 | 0 |
| Comp. Ex. 7 | 50 | 100 | 0.31 | 0 |
| Comp. Ex. 8 | 100 | 0 | 0.30 | 0 |
| Comp. Ex. 9 | 100 | 50 | 0.36 | 0 |
| Comp. Ex. 10 | 100 | 100 | 0.42 | 0 |

| | Results of flammability test | | | | | | |
|---|---|---|---|---|---|---|---|
| | Burning rate (mm/min) | After flame time (sec) | Grade | Resistance to abrasion | Resistance to pilling | Resistance to light | Overall judgment |
| Comp. Ex. 5 | 0 | 22 | Self-e* | L | H | L | L |
| Comp. Ex. 6 | 0 | 18 | Self-e* | L | H | L | L |
| Comp. Ex. 7 | 0 | 0 | Self-e* | L | H | L | L |
| Comp. Ex. 8 | 0 | 0 | Self-e* | L | H | L | L |

TABLE 2-continued

| | | | | | | | |
|---|---|---|---|---|---|---|---|
| Comp. Ex. 9 | 0 | 0 | Self-e* | L | H | L | L |
| Comp. Ex. 10 | 0 | 0 | Self-e* | L | H | L | L |

Note:
Self-e* = Self-extinguishing

TABLE 3

| | Polyurethane | | Phosphorus content of base fabric (wt. %) | Amount of fiber in layer (A) based on base fabric (wt. %) |
|---|---|---|---|---|
| | Type | Adhesion amount (wt. %) | | |
| Comp. Ex. 11 | Polycarbonate type | 3 | 0.20 | 47 |
| Ex. 12 | polyurethane water- | 5 | 0.20 | 47 |
| Ex. 13 | soluble emulsion | 7 | 0.19 | 47 |
| Ex. 14 | | 14 | 0.18 | 47 |
| Ex. 15 | | 20 | 0.17 | 47 |
| Comp. Ex. 12 | | 25 | 0.17 | 47 |
| Comp. Ex. 13 | Polyether type | 3 | 0.20 | 47 |
| Ex. 16 | polyurethane water- | 5 | 0.20 | 47 |
| Ex. 17 | soluble emulsion | 7 | 0.19 | 47 |
| Ex. 18 | | 14 | 0.18 | 47 |
| Ex. 19 | | 20 | 0.17 | 47 |
| Comp. Ex. 14 | | 25 | 0.17 | 47 |
| Comp. Ex. 15 | Polyether type | 3 | 0.20 | 47 |
| Comp. Ex. 16 | polyurethane in DMF | 5 | 0.20 | 47 |
| Comp. Ex. 17 | solution | 7 | 0.19 | 47 |
| Comp. Ex. 18 | | 14 | 0.18 | 47 |
| Comp. Ex. 19 | | 20 | 0.17 | 47 |
| Comp. Ex. 20 | | 25 | 0.17 | 47 |

| | Results of flammability test | | | | | | |
|---|---|---|---|---|---|---|---|
| | Burning rate (mm/min) | After flame time (sec) | Grade | Resistance to abrasion | Resistance to pilling | Resistance to light | Feel of artificial leather |
| Comp. Ex. 11 | 0 | 0 | Self-e* | L | H | M | Poor (poor in resilient touch) |
| Ex. 12 | 0 | 0 | Self-e* | M | H | M | Good |
| Ex. 13 | 0 | 3 | Self-e* | H | H | M | Good |
| Ex. 14 | 0 | 10 | Self-e* | H | H | M | Good |
| Ex. 15 | 0 | 18 | Self-e* | H | H | M | Ordinary |
| Comp. Ex. 12 | 72 | — | Second | H | H | M | Poor (becoming stiff) |
| Comp. Ex. 13 | 0 | 3 | Self-e* | L | H | M | Poor (poor in resilient touch) |
| Ex. 16 | 0 | 8 | Self-e* | M | H | M | Good |
| Ex. 17 | 0 | 18 | Self-e* | H | H | M | Good |
| Ex. 18 | 0 | 10 | Self-e* | H | H | M | Good |
| Ex. 19 | 0 | 22 | Self-e* | H | H | M | Ordinary |
| Comp. Ex. 14 | 72 | — | Second | H | H | M | Poor (becoming stiff) |
| Comp. Ex. 15 | 0 | 3 | Self-e* | L | H | M | Poor (poor in resilient touch) |
| Comp. Ex. 16 | 0 | 15 | Self-e* | L | H | M | Poor (poor in resilient touch) |
| Comp. Ex. 17 | 72 | — | Second | L | H | M | Poor (poor in resilient touch) |
| Comp. Ex. 18 | 83 | — | Third | L | H | M | Ordinary |
| Comp. Ex. 19 | 130 | — | Out of grade | M | H | M | Good |

TABLE 3-continued

| | | | | | | | |
|---|---|---|---|---|---|---|---|
| Comp. Ex. 20 | 144 | — | Out of grade | H | H | M | Good |

Note:
Self-e* = Self-extinguishing

TABLE 4

| | | Concentration of flame retarder (wt. %) | Phosphorus content of base fabric (wt. %) | Results of flammability test | | | |
|---|---|---|---|---|---|---|---|
| | Flame retarder | | | Burning rate (mm/min) | Grade | Falling of liquid drops | Feel of artificial leather |
| Ex. 20 | P-205 | 0 | 0.27 | 0 | Self-e* | Yes | Extremely good |
| Ex. 21 | | 1 | 0.37 | 0 | Self-e* | Yes | Extremely good |
| Ex. 22 | | 5 | 0.77 | 0 | Self-e* | Yes | Good |
| Ex. 23 | | 7.5 | 1.02 | 0 | Self-e* | Yes | Good |
| Ex. 24 | | 10 | 1.27 | 0 | Self-e* | No | Good |
| Ex. 25 | | 15 | 1.77 | 0 | Self-e* | No | Good |
| Ex. 26 | | 20 | 2.27 | 0 | Self-e* | No | Ordinary |
| Ex. 27 | P-72 | 0 | 0.27 | 0 | Self-e* | Yes | Extremely good |
| Ex. 28 | | 1 | 0.37 | 0 | Self-e* | Yes | Extremely good |
| Ex. 29 | | 5 | 0.77 | 0 | Self-e* | Yes | Good |
| Ex. 30 | | 7.5 | 1.02 | 0 | Self-e* | Yes | Good |
| Ex. 31 | | 10 | 1.27 | 0 | Self-e* | No | Good |
| Ex. 32 | | 15 | 1.77 | 0 | Self-e* | No | Good |
| Ex. 33 | | 20 | 2.27 | 0 | Self-e* | No | Ordinary |

Note:
Self-e* = Self-extinguishing

TABLE 5

| | Comp. Ex. 21 | Ex. 34 | Ex. 35 | Ex. 36 | Ex. 37 | Comp. Ex. 22 |
|---|---|---|---|---|---|---|
| First layer**: 60 g/m$^2$ | H-PET | H-PET | H-PET | H-PET | H-PET | P-PET |
| Second layer**: 60 g/m$^2$ | H-PET | H-PET | H-PET | H-PET | P-PET | P-PET |
| Third layer**: 60 g/m$^2$ | H-PET | H-PET | H-PET | P-PET | P-PET | P-PET |
| Fourth layer**: 60 g/m$^2$ | H-PET | H-PET | P-PET | P-PET | P-PET | P-PET |
| Fifth layer**: 60 g/m$^2$ | H-PET | P-PET | P-PET | P-PET | P-PET | P-PET |
| Phosphorus content of base fabric (wt. %) | 0 | 0.1 | 0.2 | 0.3 | 0.4 | 0.5 |
| Amt. of fiber in layer (A) based base fabric (wt. %) | 60 | 60 | 60 | 40 | 20 | 0 |
| Burning rate⁺ (mm/min) | 78 | 0 | 0 | 0 | 0 | 0 |
| After flame time⁺ (sec) | — | 23 | 10 | 2 | 0 | 0 |
| Grade⁺ | Third | Self-e* | Self-e* | Self-e* | Self-e* | Self-e* |
| Resistance to abrasion | H | H | H | H | M | L |
| Resistance to pilling | H | H | H | H | H | H |
| Resistance to light | M | M | M | M | M | L |
| Overall judgment | L | H | H | H | M | L |

Note:
H-PET = homopolymer polyester
P-PET = phosphorus copolymerized polyester
Self-e* = Self-extinguishing
**The layers forming a base fabric
⁺Results of flammability test

TABLE 6

| | | Ex. 36 | Ex. 39 | Ex. 40 | Ex. 41 | Ex. 42 | Ex. 43 |
|---|---|---|---|---|---|---|---|
| First layer** (H-PET short fibers) | Fabric weight (g/m$^2$) | 90 | 90 | 60 | 90 | 60 | 30 |
| | Intrinsic viscosity (IV) | 0.50 | 0.63 | 0.63 | 0.70 | 0.70 | 0.70 |
| Second layer** (P-PET short fibers) | Fabric weight (g/m$^2$) | 60 | 60 | 90 | 60 | 90 | 120 |
| Third layer** (P-PET short fibers) | Fabric weight (g/m$^2$) | 100 | 100 | 100 | 100 | 100 | 100 |

TABLE 6-continued

|  | Ex. 36 | Ex. 39 | Ex. 40 | Ex. 41 | Ex. 42 | Ex. 43 |
|---|---|---|---|---|---|---|
| Fourth layer** Fabric weight (P-PET short fibers) (g/m$^2$) | 50 | 50 | 50 | 50 | 50 | 50 |
| Phosphorus content of base fabric (wt. %) | 0.35 | 0.35 | 0.4 | 0.35 | 0.4 | 0.45 |
| Amount of fiber in layer (A) based on base fabric (wt. %) | 30 | 30 | 20 | 30 | 20 | 10 |
| Burning rate+ (mm/min) | 0 | 0 | 0 | 0 | 0 | 0 |
| After flame time+ (sec) | 2 | 2 | 0 | 1 | 1 | 0 |
| Grade+ | Self-e* | Self-e* | Self-e* | Self-e* | Self-e* | Self-e* |
| Resistance to abrasion | M | H | H | H | H | H |
| Resistance to pilling | H | H | H | M | M | M |
| Resistance to light | M | M | M | M | M | M |
| Overall judgment | M | H | H | M | M | M |

Note:
H-PET = homopolymer polyester
P-PET = phosphorus copolymerized polyester
Self-e* = Self-extinguishing
**The layers forming a base fabric
+Results of flammability test

TABLE 7

|  |  | Ex. 44 | Ex. 45 | Ex. 46 | Ex. 47 |
|---|---|---|---|---|---|
| Structure of base fabric and phosphorus content (wt. %) | First layer: 60 g/m$^2$ | 0 | 0 | 0 | 0 |
|  | Second layer: 60 g/m$^2$ | 0.5 | 1.0 | 1.0 | 2.0 |
|  | Third layer: 60 g/m$^2$ | 0.5 | 1.0 | 1.0 | 2.0 |
|  | Fourth layer: 60 g/m$^2$ | 1.0 | 1.0 | 2.0 | 2.0 |
|  | Fifth layer: 60 g/m$^2$ | 1.0 | 1.0 | 2.0 | 2.0 |
| Phosphorus content of base fabric (wt. %) |  | 0.6 | 0.8 | 1.2 | 1.6 |
| Amount of fiber in layer (A) based on base fabric (wt. %) |  | 20 | 20 | 20 | 20 |
| Results of flammability test | Burning rate (mm/min) | 0 | 0 | 0 | 0 |
|  | After flame time (sec) | 0 | 0 | 0 | 0 |
|  | Grade | Self-e* | Self-e* | Self-e* | Self-e* |
| Resistance to abrasion |  | M | M | M | M |
| Resistance to pilling |  | H | H | H | H |
| Resistance to light |  | M | M | M | M |
| Overall judgment |  | M | M | M | M |

Note:
Self-e* = Self-extinguishing

INDUSTRIAL APPLICABILITY

The present invention can provide an artificial leather having a flexible feel and excellent flameproof properties and containing no halogen compounds that can become dioxin sources.

The artificial leather of the present invention is excellent in resistances to abrasion and light and, at the same time, it has excellent flameproof properties. Moreover, because the artificial leather of the present invention can be designed to have a small fabric weight in comparison with an artificial leather that is prepared by a backing method, for which an inorganic flame retarder is used, or an artificial leather for which an organic solvent type polyurethane resin is used, the artificial leather of the invention is appropriate to applications such as automobile seats and airplane seats that are required to be lighten. Furthermore, because the artificial leather has a flexible feel and an excellent resistance to pilling, it is appropriate to seats for furniture. Still furthermore, because the artificial leather has excellent flameproof properties, it can be used for seat materials required to have flameproof properties of high grade in facilities where many people gather such as public facilities, movie theaters and theaters.

The invention claimed is:

1. A flameproof artificial leather comprising an artificial leather base fabric in which thermoplastic synthetic fibers are three dimensionally interlaced with each other and a water-soluble polyurethane resin, and having a layer (A) that is a surface layer and a layer (B) that is other than the layer (A), the fiber forming the layer (A) is an extremely fine thermoplastic synthetic fiber having a size of 0.5 dtex or less and is excellent in resistance to abrasion and/or resistance to light, the extremely fine thermoplastic synthetic fiber being formed from a polyester homopolymer that has an intrinsic viscosity (IV) of 0.50 to 0.70, the content of the extremely fine thermoplastic synthetic fiber being from 10 to 60% by weight based on the artificial leather base fabric, and at least one layer of the layer (B) having a phosphorus-containing flameproof thermoplastic synthetic fiber, the content of phosphorus being 0.09% by weight or more based on the artificial leather base fabric, wherein the content of the water-soluble polyurethane resin is from 5 to 20% by weight based on the artificial leather base fabric and the water-soluble polyurethane resin contains no flameproof component.

2. The flameproof artificial leather according to claim 1, wherein the resistance to abrasion measured in accordance with JIS L 1018 (E method: Martindale method) is 50,000 times or more.

3. The flameproof artificial leather according to claim 1 or 2, wherein the extremely fine thermoplastic synthetic fiber is formed from a polyester homopolymer having an intrinsic viscosity (IV) of from 0.50 to 0.63 and shows an excellent resistance to pilling.

4. The flameproof artificial leather according to claim 1 or 2, wherein the flameproof thermoplastic synthetic fiber containing phosphorus is a phosphorus-containing polyester fiber.

5. The flameproof artificial leather according to claim 4, wherein the phosphorus-containing polyester fiber is a phosphorus copolymerized polyester fiber.

6. The flameproof artificial leather according to claim 1 or 2, wherein the layer (B) has a scrim formed from a phosphorus-containing polyester fiber.

7. The flameproof artificial leather according to claim 1 or 2, wherein an organic phosphorus flame retarder is imparted by after-treatment after dyeing.

* * * * *